US008019962B2

(12) United States Patent  (10) Patent No.: US 8,019,962 B2
Armstrong et al.  (45) Date of Patent: Sep. 13, 2011

(54) SYSTEM AND METHOD FOR TRACKING THE MEMORY STATE OF A MIGRATING LOGICAL PARTITION

(75) Inventors: William Joseph Armstrong, Rochester, MN (US); Michael J. Corrigan, Rochester, MN (US); Stuart Zachary Jacobs, Lakeville, MN (US); David Anthony Larson, Rochester, MN (US); Naresh Nayar, Rochester, MN (US); Wade Byron Ouren, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 851 days.

(21) Appl. No.: 11/735,809

(22) Filed: Apr. 16, 2007

(65) Prior Publication Data

US 2008/0256321 A1  Oct. 16, 2008

(51) Int. Cl.
*G06F 12/00* (2006.01)
(52) U.S. Cl. ........ 711/173; 711/153; 711/165; 711/207; 710/28
(58) Field of Classification Search .................. 711/165, 711/153, 173, 207; 710/28
See application file for complete search history.

(56) References Cited

U.S. PATENT DOCUMENTS

| | | | |
|---|---|---|---|
| 5,440,727 A * | 8/1995 | Bhide et al. | 711/117 |
| 5,636,373 A | 6/1997 | Glendening et al. | |
| 6,044,447 A | 3/2000 | Averill et al. | |
| 6,510,496 B1 * | 1/2003 | Tarui et al. | 711/147 |
| 2007/0011495 A1 * | 1/2007 | Armstrong et al. | 714/39 |
| 2008/0120518 A1 * | 5/2008 | Ritz et al. | 714/3 |
| 2008/0163239 A1 * | 7/2008 | Sugumar et al. | 718/105 |
| 2009/0013149 A1 | 1/2009 | Uhlig et al. | |

OTHER PUBLICATIONS

U.S. Patent and Trademark Office, Office Action issued in related U.S. Appl. No. 11/735,830, dated Dec. 10, 2009.

* cited by examiner

*Primary Examiner* — Yong Choe
(74) *Attorney, Agent, or Firm* — Wood, Herron & Evans, LLP

(57) ABSTRACT

An apparatus, program product and method for tracking the state of a migrating logical partition. Embodiments may use the state to determine the readiness and/or appropriateness of a page of the logical partition for transferring. The state may include a value or other data used to track changes affecting the page or the relative ease and/or appropriateness of migrating the page. A page manager table with entries corresponding to the state of each page of the logical partition may be used to track the state while the logical partition continues to run during a migration.

18 Claims, 3 Drawing Sheets

SYSTEM AND METHOD FOR TRACKING THE MEMORY STATE OF A MIGRATING LOGICAL PARTITION

CROSS-REFERENCE TO RELATED APPLICATIONS

This application is related to the following U.S. Patent Applications all filed on even date herewith, the disclosures of which are incorporated by reference herein: No. 11/735,830, entitled "SYSTEM AND METHOD FOR MAINTAINING PAGE TABLES USED DURING A LOGICAL PARTITION MIGRATION" by Stuart Zachary Jacobs et al. (ROC920070009US1); No. 11/735,750, entitled "SYSTEM AND METHOD FOR UPDATING A TIME-RELATED STATE OF A MIGRATING LOGICAL PARTITION" by William Joseph Armstrong et al. (ROC920070015US1); and No. 11/735,770 entitled "SYSTEM AND METHOD FOR DETERMINING FIRMWARE COMPATIBILITY FOR MIGRATING LOGICAL PARTITIONS" by William Joseph Armstrong et al. (ROC920070062US1).

FIELD OF THE INVENTION

The present invention relates to computing systems, and more particularly, to managing a logical partition migration between computer systems.

BACKGROUND OF THE INVENTION

Data migration refers generally to the processes of moving computer data from one computer location to another. For instance, an administrator may facilitate maintenance or updates by transferring applications and/or memory from one operating system or computer to another. While necessary, data migration can pose a tremendous challenge and risk to businesses, government agencies and individuals that depend upon uninterrupted computer access. Too often, software installation problems occur. Such problems may be attributable to faulty program code or unforeseeable interactions within a processing environment. For example, stored data may be lost or corrupted during a transfer. Such problems can result in costly system errors and downtime.

Problems relating to data transfers may be compounded in logically partitioned environments, where unique resource sharing and access practices may present additional considerations. Logical partitioning provides a programmed architecture suited for assigning and sharing computing assets. A partition may logically comprise a portion of a machine's physical processors, memory and other resources. As such, an administrator may allocate the same resources to more than one partition. Each partition may additionally host an operating system, in addition to multiple virtual processors. An underlying program called a hypervisor, or partition manager, assigns and dispatches physical processors to each virtual processor. Each partition typically has unique connections for communicating with a network. In this manner, each partition operates largely as if it is a separate computer.

During a migration, the state of the migrating logical partition, including applicable memory, processor/register state information, and connection information regarding physical interface/discs associated with the virtual partition components, etc., is transferred to another logical partition of another computer. The migration may be motivated to accommodate new hardware or program updates on the computer of the migrating logical partition. Oftentimes the migrated logical partition is eventually returned to the original logical partition location.

The migrating partition ideally continues work without interruption on the new logical partition, e.g. transparently. To this end, the migrating partition may run in a virtualized environment during the migration to be separate from the physical hardware underneath. The hypervisor may be responsible for providing the infrastructure that allows for the migration to occur from the source logical partition to a target logical partition. The target logical partition may be newly created for the migration, is typically located on a separate, physical computer, and is configured to accommodate the state of the transferred logical partition.

In scenarios where a logical partition is migrating to another server computer, it may be necessary to account for and otherwise preserve storage operations, or page entries, affecting the state, e.g., stored memory, of the migrating logical partition. The preserved integrity of such entries may be necessary for the proper operation of the partition once it has migrated. Put another way, the state/entries for each page of a logical partition should be preserved or otherwise maintained during the migration to allow for a relatively seamless resumption of the migrated partition's work. For this same reason, the maintenance of partition pages, e.g., portions of memory, should not require noticeable downtime of the computer system.

Failure to maintain the state of the migrating partition could lead to a partition outage or a lack of data integrity in the migrating partition. Any such problem resulting from an unsuccessful migration can result in the loss of business and man hours. Manually tracking of the overwhelming amount of memory updates would be preclusively slow, tedious and complicated. Such potential problems may further translate into a reluctance to migrate partitions in instances where such transfers would otherwise improve system performance.

There is consequently a need for an improved manner of migrating data and associated processes within a logically partitioned environment.

SUMMARY OF THE INVENTION

The present invention provides an apparatus, method and program product configured to facilitate firmware migration in a logically partitioned environment by automatically tracking the state of a page of a migrating logical partition. In one aspect of the invention, processes facilitate the migration of a logical partition using a table having a plurality of entries corresponding to a plurality of page states. The table entries may record and maintain the state for respective pages as the logical partition migrates.

In one embodiment of the invention, the state of the page comprises a numerical value indicative of an amount of changes affecting the page during the migration. The numerical value may be incremented or otherwise increased in response to an entry for the page that allows a storage operation. Conversely, the numerical value may be decreased in response to an entry for the page that disallows a storage operation.

In another aspect of the invention, the state of the page may be used to determine a relative level of complexity concerning the potential migration of the page as compared to the state of another page. Moreover, the state of the page may be used to indicate a status regarding whether the page has been migrated, should be migrated, or should not be migrated. The state may additionally indicate whether a page has been altered subsequent to an initial migration of the page.

As such, embodiments consistent with the invention may migrate the page based on the state of the page relative to another state of another page of the logical partition. Where so configured, embodiments may take action to decrease the state of the page by evicting a page entry, e.g., disallowing a storage operation, so as to bring the state closer to an ideal status for migration.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
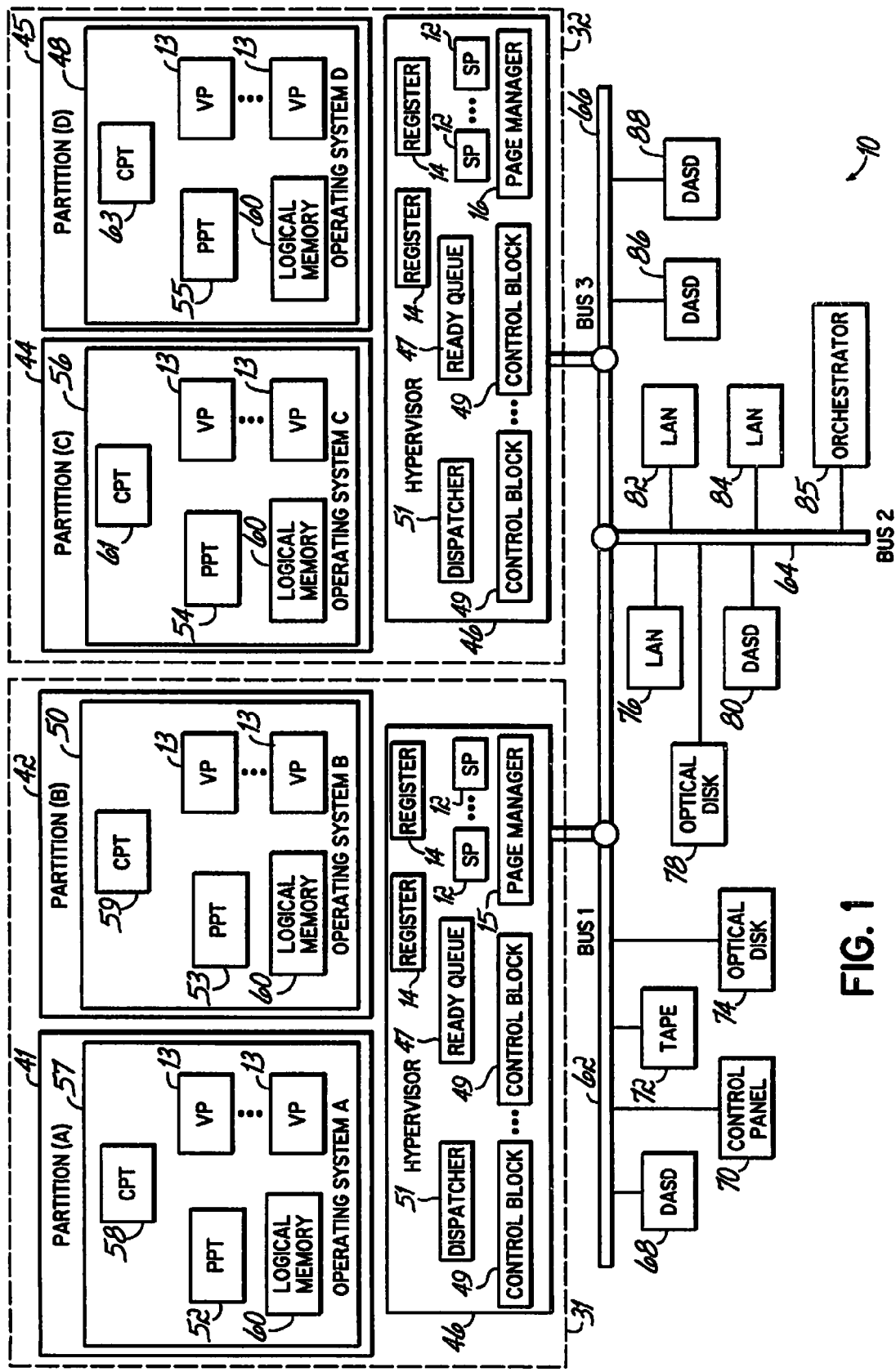
FIG. 1 is a block diagram of a computer system configured to track the state of a migrating logical partition in a manner that is consistent with principles of the present invention.

Features of the present invention include an apparatus, program product and method for tracking the state of a page of a migrating logical partition. Embodiments may use the state to determine the readiness and/or appropriateness of the page of the logical partition for transferring. The state may include a value or other data indicative of the number of changes affecting the page or the relative ease and/or appropriateness of migrating the page. A page manager table with entries corresponding to the state of each page of the logical partition may be used to track the state while the logical partition continues to run during a migration.

When migrating, a logical partition may advantageously run in a virtualized environment to be separate from the physical hardware underneath. The hypervisor may be responsible for providing the infrastructure that allows for the migration to occur from the source logical partition to a target logical partition. The target logical partition may be newly created for the migration, having a framework structure configured to accommodate the transferred logical partition.

While operating in virtualized partition memory mode during a migration, the system may provide hypervisor directed analogs of the storage interrupts, ISI (instruction storage interrupt) and DSI (data storage interrupt). This feature may allow the hypervisor to respond to page table misses. Embodiments thus may further allow the hypervisor to track page entries to the partition's memory, and in so doing, maintain a state for each page in the partition's memory.

As the partition runs in virtualized partition memory mode and references memory, page entries may be added to the page table. In one embodiment, pages of a table may include addresses used to locate physical memory. As the partition's memory is referenced, the processors may update referenced, changed and tag set bits of the page entries. Such bits may generally indicate whether a page has been used, altered, or is in an unalterable state, respectively.

As part of moving a running partition from one physical system to a different physical system, the entire state of the partition may need to be transferred. This state may include some or all of the memory assigned to the partition. Transferring all the contents of memory would require completely stopping the running partition. The partition, however, may have a large amount of memory, which may require the partition to be stopped and unavailable for an unacceptable amount of time.

To avoid stopping the running partition for a long period of time, the contents of the partition's memory may need to be transferred while it is running. Since the partition continues to run, however, the contents of the partition's memory may be constantly changing. This may create a problem of how to correctly and efficiently transfer the contents to the target system. In order to do this efficiently, some form of tracking may be needed to determine when a page has changed (since it was last transferred to the target partition).

One process addressing this problem may include tracking each page of the partition's memory using a single bit. This bit could indicate whether the page contents have changed since the last time they were transferred to the target. This tracking technique may not be relatively efficient, however, because there may be no easy way to determine the likelihood of each page changing, again (once it has already been changed and/or migrated). For example, if a page is mapped in a page table, it remains likely that the page may be further modified through a store operation of a direct memory access operation. Without any intelligence built into the hypervisor, such a page may likely be transmitted multiple times. Unnecessary transfers may increase the total time for the migration.

Embodiments consistent with the present invention may further address these issues by enabling the hypervisor to make efficient determinations concerning when to transfer each page. More particularly, aspects of the invention may provide additional information that the hypervisor may use to make decisions, such as when to transfer a page to the target system. To this end, the hypervisor may maintain in a page manager table a state value, e.g., a byte value, for each page in the partition's memory.

When a migration of the partition is initialized, the state of each page may initialized to 0x00 to indicate that the page's contents may need to be transferred to the target system. As the partition references memory, the state may be used to keep track of a reference count for the page. This reference count may be the number of references (page table entries or translation control entries) that indicate write access. These counted references may be of the type likely to result in the page changing due to a store by the migrating partition or a direct memory access operation.

When the contents of a page are transferred to the target system, the state for the page may be set to 0xFF to indicate that the source and target now contain exact copies of the page. Since 0xFF is a special value, the number of references recorded may need to be capped. When the number of references reaches 0xFD, for instance, any additional references may cause the state byte to change to 0xFE, which is used to indicate permanently referenced. The state value may persist in this state until the page contents may be transferred, e.g., when the source partition is no longer running.

Maintaining the state value may involve increasing the state, or reference count, each time a page is mapped in a page table. Conversely, the reference count may decrement each time the page is unmapped in the page table. If the state byte for the page is set to 0xFF and a store occurs to the page while an operation is performed by the hypervisor, then the state may be changed to 0x00 to indicate that the page may needs to be transferred to the target system. Pages that have a non-zero reference count may not be speculatively migrated.

There may be various decisions made by the hypervisor that may be supported by the state for each page. For instance, after a migration of a partition is initialized, but prior to the temporary suspension of the partition (which is a short period of time where processor state and other required information is sent to the target system), the hypervisor may speculatively transfer contents of the partition's memory to the target system. More particularly, the hypervisor may use the state for each partition memory page to determine which pages to transfer. Pages with no (or low) reference counts may be excellent candidates because they are unlikely to change (they do not have any entries in the page tables).

Once the partition has resumed running on the target system, demand paging of pages that have not been transferred from the source may be performed. The hypervisor may use the state byte for each partition memory page to identify high use pages (those with a high reference count and likely to cause a page fault on the target system). When the partition is temporarily suspended, the hypervisor may transfer these high use pages before resuming the partition on the target system and possibly reduce the number of page faults requiring demand paging.

In one embodiment, the hypervisor may background scan the page table and evict entries with write access, e.g., disallowing a storage operation. The hypervisor may use the state for each partition memory page to identify pages to target when evicting page table entries. For example, the hypervisor may try to reduce the reference count of pages with a low reference count by evicting entries so that the reference count of the page decreases. For example, if evicting a page table entry makes the reference count go to zero, the page may be speculatively migrated.

The state value, itself, may also be used to indicate special information about a partition memory page. Other special values may be used to indicate, for example, pages that may need to be transferred at a specific time. The above mechanism may provide the hypervisor with information to effectively and efficiently handle transferring the contents of a partition's memory during a live partition migration.

Hardware and Software Environment

Turning more particularly to the drawings, FIG. 1 illustrates a data processing system 10, or apparatus, configured to track the state of a migrating logical partition in a manner that is consistent with principles of the present invention. System 10 more particularly represents the primary software components and resources used to implement a logically partitioned environment consistent with embodiments of the invention.

As such, FIG. 1 includes a computing architecture characterized as a virtual machine design, as developed by International Business Machines Corporation. The networked apparatus/system 10 includes a plurality of partitions 41, 42 and 44, 45 that may share common processing resources among multiple processes within their respective server computers 31, 32. Each computer 31, 32 may rely upon a single computing machine having one or more physical processors 12, or central processing units (CPU's). The physical processors 12 may execute software configured to simulate multiple virtual processors 13.

The partitions 41, 42, 44, 45 may logically comprise a portion of a system's physical processors 12, memory and other resources as assigned by an administrator. Each partition 41, 42, 44, 45 typically hosts an operating system 48, 50, 56, 57 and may have multiple virtual processors 13. In this manner, each partition 41, 42, 44, 45 may operate largely as if it is a separate computer.

As shown in FIG. 1, physical page tables 52, 53, 54, 55 and cache page tables 58, 59, 61, 63 are shown in FIG. 1 as being associated with respective partitions 50, 56, 57, 58. However, this association is not intended to imply that the page tables, i.e., the physical page tables 52, 53, 54, 55 and cache page tables 58, 59, 61, 63, are partition resources. For instance, the page tables may actually be resources of the hypervisors 46. As such, the placement the tables as shown in FIG. 1 is intended to more clearly show the association of each table with the respective partition. While not operating in virtualized partition memory mode, the cache page tables 58, 59, 61, 63 may operate respectively as the only page tables for accepting entries from the partitions 41, 42, 44, 45 and processors 12. The physical page table 52, 53, 54, 55 may be relatively smaller than the cache page table 58, 59, 61, 63, and may receive page entries from processors 12 while the logical partitions 41, 42, 44, 45 are in virtualized partition memory mode. Processors may use the page tables to transparently convert a program's virtual address into a physical address where that page has been mapped into physical memory Underlying programs, called hypervisors 46, or partition managers, may generally use the physical page table 52, 53, 54, 55 to update the cache page table 58, 59, 61, 63. The hypervisors 46 typically are responsible for assigning physical resources to each partition 41, 42, 44, 45. For instance, a hypervisor 46 may intercept requests for resources from operating systems 48, 50, 56, 57 to globally share and allocate resources. If the partitions 41, 42 and 44, 45 within each server 31, 32 are respectively sharing processors 12, the hypervisor 46 allocates physical processor cycles between the virtual processors 13 of the partitions 41 and 42, 44 and 45 sharing the physical processors 12.

As shown in FIG. 1, SDR1 registers 14 may be pointed to the physical page table 52, 53, 54, 55 while in virtualized partition memory mode. A SDR1 register 14 may provide the processors 12 with the location and size of a physical page table 52. A page manager 15, 16 may be used by the hypervisor 46 to track changes to logical partition pages during migration. For instance, a page manager 15, 16 may include entries indicative of the state of each page of a partitions memory.

While the physical page table 52, 53, 54, 55, cache page table 58, 59, 61, 63 and page managers 15, 16 are shown in FIG. 1 as being included within either the logical partitions 41, 42, 44, 45 or the hypervisors 46, it should be understood by one of skill in the art that the virtual nature of these features may allow that the physical page table 52, 53, 54, 55, cache page table 58, 59, 61, 63 and page managers 15, 16 could otherwise be represented at other locations within the system 10 of FIG. 1. As shown, the relative positions of the features are generally intended to represent that the access, control and/or association of the physical page table 52, 53, 54, 55, cache page table 50, 55, 56, 57 and page managers 15, 16 with respect to other components of the logical partitions 41, 42, 44, 45.

Each operating system 50, 55, 56, 57 controls the primary operations of its respective logical partition 41, 42, 44, 45 in a manner similar to the operating system of a non-partitioned computer. Each logical partition 41, 42, 44, 45 may execute in a separate memory space, represented by logical memory 60. Moreover, each logical partition 41, 42, 44, 45 may be statically and/or dynamically allocated a portion of the available resources in its respective computer 31, 32 of networked system 10. For example and as discussed herein, each logical partition 41, 42, 44, 45 may share one or more physical processors 12, as well as a portion of the available memory space for use in logical memory 60. In this manner, a given processor may be utilized by more than one logical partition.

The hypervisors 46 may include a dispatcher 51 that manages the dispatching of virtual processors to physical processors on a dispatch list, or ready queue 47. The ready queue 47 comprises memory that includes a list of virtual processors having work that is waiting to be dispatched on a physical processor 12. The hypervisors 46 shown in FIG. 1 also includes physical processors 12, in addition to processor control blocks 49. The processor control blocks 49 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 1 illustrates, for example, three logical buses 62, 64 and 66, with a plurality of resources on bus 62, including a direct access storage device (DASD) 68, a control panel 70, a tape drive 72 and an optical disk drive 74, allocated to a partition. Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

An orchestrator program 85 may communicate with migrating partitions to coordinate and otherwise facilitate the migration, as described below in detail. While the orchestrator program 85 program is shown in FIG. 1 as being networked to the pair of servers 31 and 32 of system 30, one skilled in the art should appreciate that another orchestrator program may be located within a server computer 31, 32 or other location within the system 30 suitable to manage a the migration between a pair of migrating partitions.

It will be appreciated that the illustration of specific resources in FIG. 1 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 1 may be implemented in a number of manners, including using various computer software applications, routines, components, programs, objects, modules, data structures, etc., referred to hereinafter as "computer programs," "tools," "programs" or "program code." Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Though not shown in FIG. 1, for instance, one skilled in the art will appreciate that other partitions may be included within other embodiments, including a partition that comprises part of the hypervisors 46. This hypervisor partition may function in many ways like the conventional partitions 41, 42, 44, 45 (and associated operating systems), but has no user interface for the customer to protect it from failures that might otherwise come about through user interaction. Furthermore, while four logical partitions 41, 42, 44, 45 are shown in FIG. 1, one skilled in the art will appreciate that more or fewer partitions may be implemented as needed. Other alternative hardware and/or software environments may thus be used without departing from the scope of the invention.

Processes for Tracking the State of a Partition Page During and to Facilitate Migration Processes consistent with the invention may allow the hypervisor 46 to identify partition memory pages that can be readily moved, e.g., those pages that have not been changed, or have been changed the least. In so doing, the hypervisor 46 may identify memory pages to be moved during a migration prior to the period when the partition is not running, or is suspended. This suspended period may coincide with a time when those remaining memory pages, which are presumably more complicated, should most efficiently take place. In this manner, embodiments may ease the burden and time required to transfer total memory.

Figure 2:
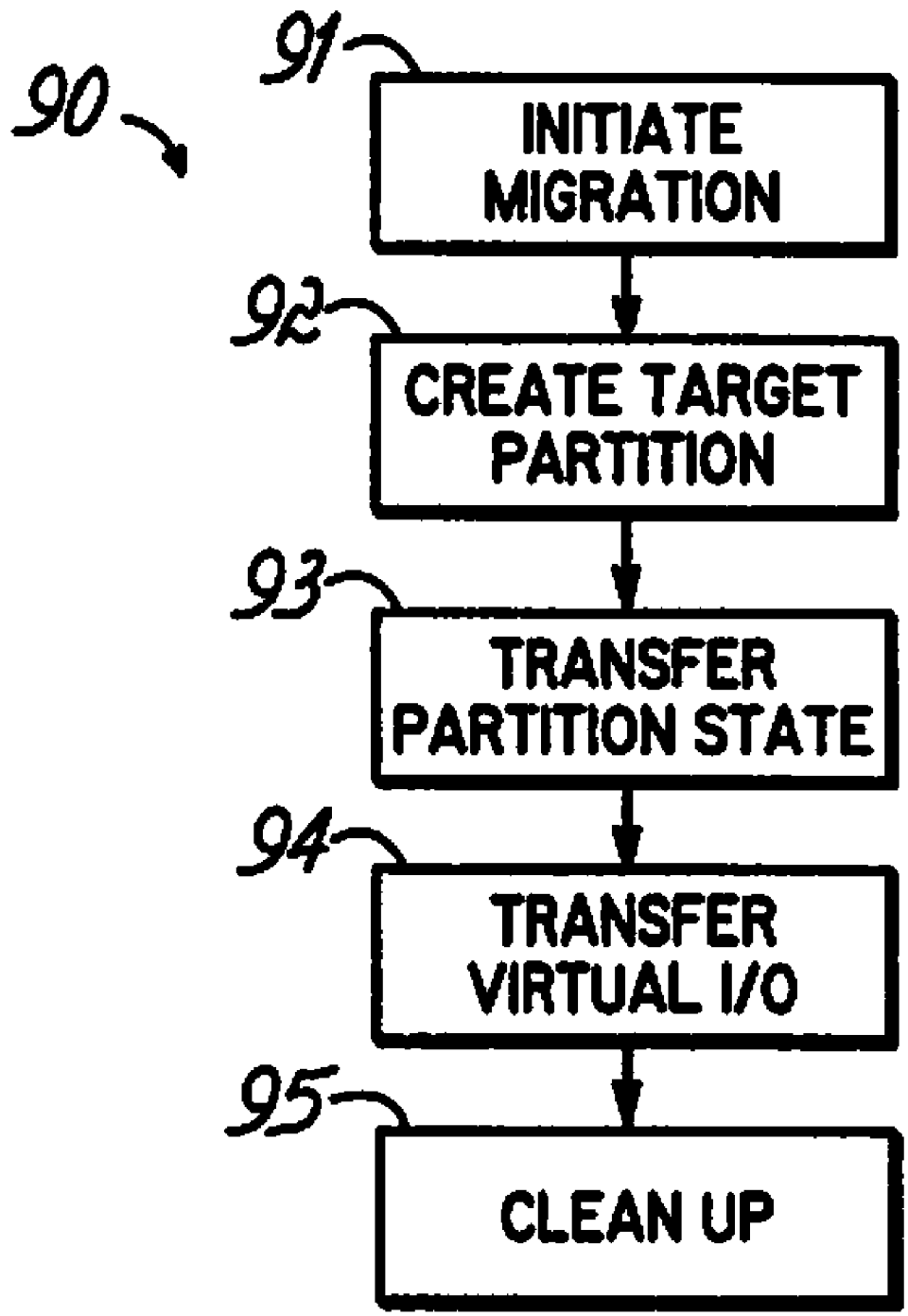
FIG. 2 is a flowchart having steps executable by the system of FIG. 1 for conducting a migration of the local partition of FIG. 1.

FIG. 2 is a flowchart 90 having steps executable by the system of FIG. 1 for executing a migration of the logical partition 42 of FIG. 1. Generally during a migration, the state of the migrating logical partition 42 is transferred to a newly created logical partition 44. The migrating partition 42 ideally continues work without interruption on the new logical partition 44 and on the target system 32.

Turning more particularly to the flowchart 90, migration processes may be initiated at block 91. Initiation processes may include prompting the orchestrator program 85 to initially communicate with a pair of logical partitions 42, 44 involved in an impending migration. The orchestrator program 85 may thus begin coordinating and otherwise facilitating the migration.

As such, the orchestrator program 85 may initiate the creation of the target partition 44 at block 92 of FIG. 2. As discussed herein, the target partition 44 is typically located on a separate, physical computer 32, and may comprise a relatively empty framework for accommodating the state of the transferred logical partition 42. Where so configured, the target logical partition 44 may include data used by the system 10 to ensure basic firmware compatibility between the target and source logical partitions 42, 44.

Memory and other state information, e.g. processor, clock and register state information, may be transferred at block 93 from the source logical partition 42 to the target logical partition 44. System processes may continue to track changes to the state information that may occur during the migration of the memory.

Similarly, virtual I/O data may be transferred at block 94 from the source logical partition 42 to the target logical partition 44. Examples of virtual I/O may include connections from the virtual components of the migrating partition to interfaces and physical resources, e.g., discs, on the source system 31. Such connection information may be transferred at block 94 so that the migrated logical partition may near seamlessly continue its work.

While the migrated logical partition was active on the source computer 31, the partition 42 may have utilized memory and other resources reserved for the partition 42 on the source system 31. Once the partition has migrated, however, it no longer needs those resources. At block 95 of FIG. 2, the orchestrator program 85 may free up the resources for other applications on the source computer 31.

Figure 3:
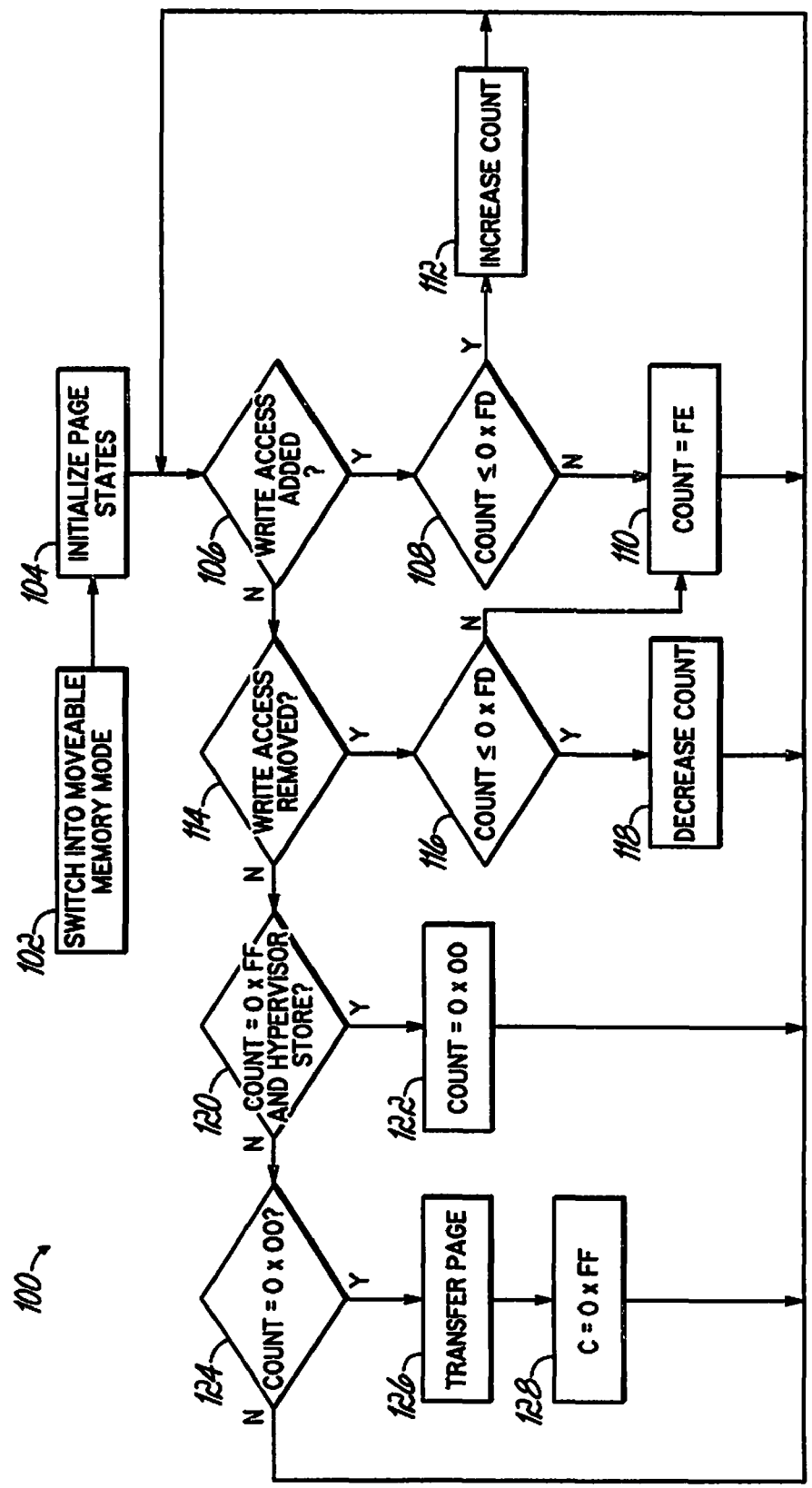
FIG. 3 is a flowchart having steps executable by the system of FIG. 1 for tracking changes made to partition page memory during a logical partition migration.

FIG. 3 is a flowchart 100 having steps executable by the system 10 of FIG. 1 for tracking changes made to partition page memory during a logical partition migration. The processes of the flowchart 100 may be taken from the perspective of the hypervisor 46 of the source partition. As such, the processes of the flowchart 100 may have application in the memory transfer and tracking processes of FIG. 2. Turning more particularly to block 102 of FIG. 3, a logical partition 42 may be switched into a memory mode facilitating migration, i.e., virtual partition memory mode.

The hypervisor 46 may at block 104 initialize to 0x00 the state, e.g., byte value, for each page of partition memory stored in the state page manager table 15. This state may coincide with the page being ready to migrate.

The hypervisor 46 may determine at block 106 whether a write access reference has been added. Examples of write access references may include page table entries or translation control entries. A translation control entry may comprise an I/O map to physical memory such as typically accomplished by a piece of hardware, e.g., a direct memory access. If so at block 106, then the logical partition 42 may determine at block 108 if the reference count is less than or equal to 0xFD. This entry may correspond to a predetermined count at which an administrator has determined that there are too many changes, e.g., 200 reference counts, regarding the page to efficiently regard for purposes of speculatively transferring the page. As such, this page may be of the type that should be transferred by the hypervisor once the migration is suspended. The page may be designated at block 110 as such.

Where the reference count is alternatively less than or equal to 0xFD, then the reference count may be increased at block 112 by a byte value for the referenced page.

If at block 106 a write access is not added, then the hypervisor 46 may determine at block 114 if a write access reference removed has occurred. If so, then the hypervisor 46 may determine at block 116 if the reference count is less than or equal to 0xFD. In response to the reference count being less than or equal to 0xFD, then the state/reference count for the page may be decreased at block 118.

The system 10 may determine at block 120 whether the page state is equal to 0xFF, and if a hypervisor store has occurred. The state of 0xFF may indicate that the page has been moved, i.e., already transferred. An example of a hypervisor store may include a hypervisor call made by a partition. Such a scenario would indicate that the page has been changed, despite the fact that it has already been migrated. As such, the page state for the partition may be set at block 122 back to 0x00, indicating that the page must be moved again. This designation will ensure that the update (hypervisor call) will be accounted for in the migration. That is, the page will be migrated, again, (and the corresponding page on the target partition 44, updated) in a manner to reflect the hypervisor store.

For all those page states equal to 0x00 as determined at block 124, the hypervisor 46 may transfer the page to the target partition 44 at block 126. The page may then be set to 0xFF at block 128.

While the present invention has been illustrated by a description of various embodiments and while these embodiments have been described in considerable detail, it is not the intention of the applicants to restrict, or in any way limit, the scope of the appended claims to such detail. For instance, another embodiment supports migration between logical partitions of the same computer. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of managing a migration of a logical partition migrating to another logical partition, the method comprising:
   automatically tracking a state of a page of the logical partition as the logical partition migrates; and
   migrating the page based on the state of the page relative to another state of another page of the logical partition,
   wherein tracking the state of the page of the logical partition further comprises using a plurality of entries corresponding to a plurality of page states.

2. The method of claim 1, further comprising determining from the state of the page of the logical partition a relative level of complexity concerning a potential migration of the page as compared to another state of another page.

3. The method of claim 1, further comprising determining from the state of the page of the logical partition a status regarding at least one of: whether the page has been migrated, whether the page is appropriate to migrate, and whether the page is not appropriate to migrate.

4. The method of claim 1, further comprising decreasing the state of the page by evicting a page entry.

5. The method of claim 1, further comprising determining from the state that a page has been altered subsequent to an initial migration of the page.

6. The method of claim 1, further comprising performing the migration.

7. A method of managing a migration of a logical partition migrating to another logical partition, the method comprising automatically tracking a state of a page of the logical partition as the logical partition migrates, wherein tracking the state of the page of the logical partition further comprises tracking a numerical value indicative of an amount of changes affecting the page.

8. The method of claim 7, further comprising increasing the numerical value in response to an entry to the page that allows a storage operation.

9. The method of claim 7, further comprising decreasing the numerical value in response to an entry to the page that disallows a storage operation.

10. The method of claim 7, further comprising migrating the page based on the state of the page relative to another state of another page of the logical partition.

11. An apparatus comprising:
- a processor;
- a logical partition having a plurality of pages and configured to use cycles of the processor; and
- program code in communication with the logical partition and executable by the processor, the program code configured to automatically track a state of a page of the plurality of pages of the logical partition as the logical partition migrates~wherein the program code initiates migrating the page based on the state of the page relative to another state of another page of the logical partition, wherein the program code is further in communication a entries corresponding to a plurality of page states.

12. The apparatus of claim 11, wherein the program code tracks a plurality of changes made to the page as the logical partition migrates.

13. The apparatus of claim 11, wherein the program code initiates determining from the state that a page has been altered subsequent to an initial migration of the page.

14. An apparatus comprising:
- a processor;
- a logical partition having a plurality of pages and configured to use cycles of the processor; and
- program code in communication with the logical partition and executable by the processor, the program code configured to automatically track a state of a page of the plurality of pages of the logical partition as the logical partition migrates, wherein the state of the page of the logical partition further comprises a numerical value indicative of an amount of changes affecting the page.

15. The apparatus of claim 14, wherein the program code initiates increasing the numerical value in response to an entry for the page that allows a storage operation.

16. The apparatus of claim 14, wherein the program code initiates decreasing the numerical value in response to an entry for the page that disallows a storage operation.

17. The apparatus of claim 14, wherein the program code initiates migrating the page based on the state of the page relative to another state of another page of the logical partition.

18. A program product, comprising:
- program code executable by a logical partition of a computer, the program code configured to automatically track a state of a page of the logical partition as the logical partition migrates, wherein the program code initiates migrating the page based on the state of the page relative to another state of another page of the logical partition, wherein tracking the state of the page of the logical partition further comprises using a plurality of entries corresponding to a plurality of page states; and
- a recordable type computer readable medium storing the program code.

\* \* \* \* \*